United States Patent [19]

Sweatman

[11] Patent Number: 4,679,325
[45] Date of Patent: Jul. 14, 1987

[54] CHALK LINE MARKING DEVICE

[76] Inventor: Bobby Sweatman, Rte. 12, Box 737 Crow Rd., Cumming, Ga. 30130

[21] Appl. No.: 852,814

[22] Filed: Apr. 16, 1986

[51] Int. Cl.⁴ ............................................. G01B 3/10
[52] U.S. Cl. ....................................... 33/138; 33/493; 33/494
[58] Field of Search ................. 33/138, 137, 494, 493, 33/414

[56] References Cited

U.S. PATENT DOCUMENTS

| | | | |
|---|---|---|---|
| 1,145,244 | 7/1915 | Hoffmann | 33/137 R X |
| 2,602,233 | 7/1950 | Irving | |
| 3,136,067 | 6/1964 | Horner | 33/137 R |
| 3,451,880 | 6/1969 | Kay | 33/137 R X |
| 4,152,836 | 5/1979 | Rodrique | 33/494 |

FOREIGN PATENT DOCUMENTS

| | | | |
|---|---|---|---|
| 1322906 | 2/1963 | France | 33/137 R |
| 1026051 | 8/1962 | United Kingdom | |

*Primary Examiner*—William D. Martin, Jr.
*Attorney, Agent, or Firm*—Jones & Askew

[57] ABSTRACT

An improved chalk line marking device for placing chalk marks at regularly spaced intervals along a straight line on a workpiece includes a composite tape having a central layer of porous material receptive to chalk. Upper and lower layers overlying the first layer have smooth surfaces substantially non-receptive to chalk. Holes are formed in the upper and lower layers at regularly spaced intervals through which the underlying portions of the central chalk-receptive layer are exposed. The composite tape is normally stored in a housing and is extensible through an aperture in the housing. The tape is chalked as it is withdrawn through the aperture, the chalk being received by the portions of the central layer exposed through the holes in the upper and lower layers, but the chalk is not absorbed by the smooth upper and lower layers. When the tape is stretched along the desired line and snapped against the workpiece, chalk is transferred from the portions of the central chalk-receptive layer exposed through the holes in the smooth outer layers onto the workpiece to provide chalk marks on the workpiece at regularly spaced intervals.

12 Claims, 2 Drawing Figures

U.S. Patent   Jul. 14, 1987   4,679,325
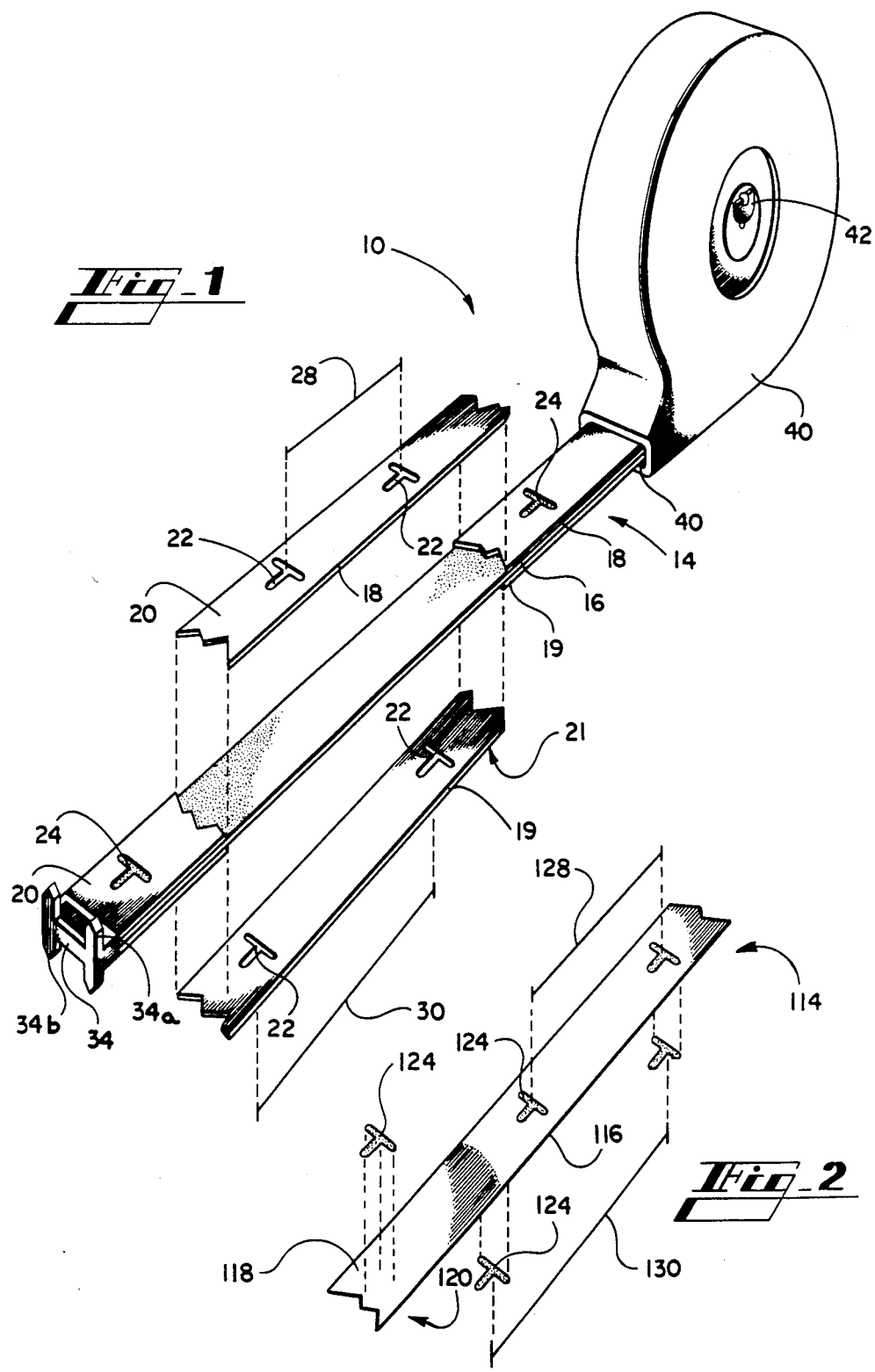
Fig_1
Fig_2

CHALK LINE MARKING DEVICE

TECHNICAL FIELD

The present invention relates generally to chalk line markers, and relates more specifically to a chalk line marker for placing chalk marks on a workpiece surface at regularly spaced intervals.

BACKGROUND OF THE INVENTION

In the construction trade and related industries, it is often necessary to position studs, walls, fasteners, and a variety of other building materials at regularly spaced-apart intervals along a straight line. Typically, such operations are carried out in two steps. First, a conventional chalk string is employed to provide a straight line along the surface of the workpiece. Such chalk strings generally comprise a length of chalk-receptive string contained on a spool within a casing and extensible through an aperture in the casing. As the string is withdrawn through the aperture, it is drawn across a body of marking chalk, the chalk particles adhering to the porous body of the string. The chalked string is stretched against the work surface along the desired line and is snapped against the surface, thereby transferring a portion of the chalk from the string to the surface of the workpiece to provide a straight chalk line. Subsequently, the worker employs a conventional measuring device, such as a folding wooden ruler or a flexible extensible metal measuring tape, and places marks along the chalk line at the desired intervals.

In order to simplify this two-step operation, efforts have been made to provide a chalk line marker which places marks on the workpiece at regularly spaced intervals along the desired line. One such example is found in British Pat. No. 1,026,051 and discloses a chalk line having sleeves of non-chalk-holding material carried by the line at regular intervals. The sleeves of non-chalk-holding material may be of gloss paint applied to the string and may be located at regularly-spaced intervals. According to this device, when the chalk line is laid, the line will have regularly-spaced interruptions along its length as an aid in measuring.

U.S. Pat. No. 4,152,836 discloses another measurement line marker for the placement of regularly-spaced marks in a straight line so as to provide position marks such as for the location of studs. The line marker consists of a thin, flexible metal wire core having a smooth, flexible, non-chalk-holding sleeve covering the major portion of the length of the wire. A number of narrow chalk-holding sleeve segments are strung on the wire at regularly-spaced intervals and are separated by the smooth, non-chalk-holding sleeve sections. When the chalk line is laid, chalk marks corresponding to the desired spacing of the wall studs are laid in a straight line on the work surface. This chalk line marker thus differs from the marker of the aforementioned British patent in that a chalk mark, rather than the absence of a chalk mark, indicates the desired intervals along the line.

These prior art efforts suffer a number of disadvantages. First, these markers are essentially linear in character and depend upon the transition between chalked and unchalked portions of the line to designate the desired intervals. However, in the event that the chalk-holding sections of the markers are not uniformly chalked, or if the marker is not properly snapped against the workpiece, an unintentional interruption or weak intensity chalk line may be mistaken for an interruption designating the regularly spaced interval.

Accordingly, there is a need to provide a line marker for the placement of regularly spaced marks in a straight line wherein the regularly spaced intervals are clearly delineated.

There is a further need to provide an apparatus for placing chalk marks at regularly spaced intervals wherein unintentional interruptions in the chalk line due to inconsistent chalking are not mistaken as designating a desired interval.

Another disadvantage associated with the prior art measurement line markers is their limitation of applying chalk marks only at a single regularly spaced interval. For example, depending upon the application, carpenters may wish to place studs at either sixteen or twenty-four inch intervals. According to the prior art, a line marker may provide marks at sixteen inch intervals; but if an application calls for twenty-four inch intervals, a different line marking device is required.

Accordingly, there is a need to provide a line marker which is capable of placing chalk marks at regularly spaced intervals of either sixteen or twenty-four inches.

SUMMARY OF THE INVENTION

As will be seen, the present invention overcomes these and other disadvantages associated with the prior art line markers. Stated briefly, the present invention comprises a chalk line marker which can place chalk marks on a workpiece surface at regularly spaced intervals of either sixteen or twenty-four inches. The resulting chalk marks are two-dimensional in character, an intersection between two lines positively defining points at the desired spaced-apart intervals. If desired, the chalk marks can be T-shaped, the stem of the T indicating to the carpenter to which side of the mark the stud is to be placed.

Stated more specifically, the improved chalk line marking device of the present invention comprises a composite tape having a layer of chalk-receptive material such as cloth interposed between upper and lower layers of non-chalk-receptive material such as smooth plastic. Holes are punched in the upper and lower plastic layers at regularly spaced intervals. As the tape is withdrawn from its housing, chalk will not adhere to the upper and lower plastic layers but will only adhere to the cloth exposed through the regularly spaced holes. In this manner, when the chalk line is snapped against the workpiece surface, chalk marks corresponding to the regularly spaced holes will be placed on the work surface. If desired, the holes in the upper plastic layer may be provided at different intervals from the holes in the lower plastic layer, so that the chalk tape may place marks, for example, twenty-four inches apart on one side, and if the tape is turned over, sixteen inches apart on the other.

An alternate embodiment of the chalk line marker of the present invention comprises a layer of non-chalk-receptive material such as smooth plastic to which are affixed at regular intervals markers of chalk receptive material, such as cloth. When the tape is chalked, chalk will not adhere to the plastic tape but will only adhere to the cloth markers affixed to the tape. When the chalk line is snapped against the workpiece surface, chalk marks corresponding to the regularly spaced cloth markers will be placed on the work surface. If desired, the cloth markers on one surface of the plastic tape may be placed at different intervals from the cloth markers on the opposing surface of the plastic tape.

Thus, it is an object of the present invention to provide an improved chalk line marker.

It is a further advantage of the present invention to provide a chalk line marker which places chalk marks at regularly spaced intervals along a straight line on a workpiece.

It is another object of the present invention to provide a chalk line marker which positively defines the desired intervals.

It is another object of the present invention to provide a chalk line marker wherein unintended interruptions in the chalk line resulting from inconsistent chalking of the marker or improper contact between the marker and the workpiece are not mistaken as designating the desired interval.

It is yet another advantage of the present invention to provide a chalk line marker capable of providing two-dimensional marks, whereby an intersection between two chalk lines, rather than the transition between chalked and unchalked segments of a single line, can indicate the desired interval.

Other objects, features, and advantages of the present invention will become apparent upon reading the following specification when taken into conjunction with the drawings and the appended claims.

BRIEF DESCRIPTION OF THE DRAWING

FIG. 1 is a partially exploded perspective view of a chalk line marker according to a preferred embodiment of the present invention.

FIG. 2 is a partially exploded perspective view of an alternate embodiment of a chalk line marker according to the present invention.

DETAILED DESCRIPTION OF THE DISCLOSED EMBODIMENT

Referring now in more detail to the drawing, in which like numerals indicate like elements throughout the several views, FIG. 1 shows an improved chalk line marking device 10 according to the present invention. The chalk line marker 10 includes a housing 12 and an extensible composite marking tape 14.

The tape 14 includes a central first layer 16 of a porous material receptive to chalk, such as cloth. The cloth layer 16 is sandwiched between an upper layer 18 and a lower layer 19 having smooth outer surfaces 20, 21 substantially non-receptive to chalk, such as plastic or metal.

The upper and lower layers have holes 22 formed therein. When the upper and lower layers 18, 19 are superimposed on the central cloth layer 16, the underlying portions 24 of the cloth layer are exposed through the holes 22. The holes 22 are spaced at regular intervals 28 in the upper layer 18 and at regular intervals 30 in the lower layer 19. In the preferred embodiment, the spaced intervals 28, 30 are sixteen inches and twenty-four inches. Also in the preferred embodiment, the holes 22 are T-shaped in the upper and lower layers 18, 19, with the leg of the T being disposed along the longitudinal axis of the tape 14 and the crossarm lying perpendicular thereto.

A hook 34 is affixed to the end 36 of the tape 14 whereby the end of the tape can be anchored to the workpiece to facilitate extension and deployment of the chalk line marker. The hook 34 is essentially H-shaped when viewed from the end and has upper hook elements 34a and lower hook elements 34b.

The housing 12 is of a design commonly used for conventional chalk strings, metal measuring tapes and the like and is well known to those skilled in the art. The tape 14 is normally coiled around a spindle (not shown) within the housing 12 and is extensible through an aperture 40 in the base of the housing. A retractable handle 42 is used to turn the spindle to retract the tape 14 into the housing 12. The handle 42 folds flat against the housing when not in use, in the manner well known to those skilled in the art.

Conventionally disposed adjacent the aperture 40 within the housing are bodies of marking chalk (not shown) disposed such that the outer surfaces 20, 21 of the tape 14 rub across the chalk as the tape is extended or retracted. Since the outer surfaces 20, 21 of the upper and lower layers 18, 19 of the tape 14 are generally non-receptive to the marking chalk, only the portions 24 of the cloth layer 16 exposed through the holes 22 in the upper and lower layers are receptive to chalking.

To use the chalk line marking device of the present invention, a user extends the tape 14 from the housing 12. The hook 34 may advantageously be secured over the end of the workpiece or on a nail or the like to hold the end 36 of the tape 14 in place as the tape is extended. As the tape is withdrawn through the aperture 40 in the housing, the upper and lower surfaces of the tape are drawn across the bodies of marking chalk disposed adjacent the aperture within the housing. Since the smooth outer surfaces 20, 21 of the upper and lower layers 18, 19 are generally non-receptive to chalk, only the portions 24 of the cloth layer 16 exposed through the apertures 22 in the upper and lower layers are chalked. The user then places the tape 14 along the surface desired to be marked, stretches the tape taut, and snaps the tape against the surface. As the tape is snapped, chalk from the chalk-receptive portions 24 exposed through the holes 22 is transferred to the work surface, forming a series of T-shaped chalk marks at regularly spaced intervals along the desired line.

One feature of the chalk line marking device 10 of the present invention is that the spaced-apart interval 28 between the holes 22 in the upper layer 18 is different from the spaced-apart interval 30 between the holes 22 in the lower layer 19. The advantage provided by this feature is that a single chalk line marking device is capable of providing chalk marks at different regularly spaced apart intervals. For example, in the present invention, the spaced-apart intervals 28, 30 are sixteen and twenty-four inches, corresponding to the most common spacings between wall studs. Thus, if a user needs to mark the location of wall studs to be placed sixteen inches on center, he would employ the chalk line marking device 10 with the tape 14 having its upper surface 18 imposed against the surface desired to be marked, using the upper hook elements 34a of the hook 34 to secure the end 36 of the tape. When it is desired to mark the locations of wall studs to be placed twenty-four inches on center, the user merely has to turn the tape over and employ the opposite side 19 against the workpiece surface, where the spaced interval 30 between holes 22 is twenty-four inches, using the lower hook elements 34b to secure the end of the tape.

Another feature of the present invention is that the chalk marks resulting from the use of the chalk line marking device 10 comprise the intersection between two lines. The prior art devices discussed above are essentially one-dimensional in nature, and they designate the desired intervals by the transition between chalked and unchalked segments along a single line. However, where the chalk line is inconsistently chalked, or where the chalk line marker is not properly snapped against the workpiece surface, an unintentional interruption in the chalk marks may be mistakenly perceived as designating the desired interval. The advantage of the chalk marks produced by the chalk line marking device of the present invention is that the intersection between two lines marks a definite point, and unintentional interruptions in the chalk mark will not be mistaken as marking the desired interval.

Another advantage of employing T-shaped holes 22 in the tape 14 is that the resulting T-shaped marks on the workpiece indicate to the user to which side of the mark a stud is to be placed. Thus, the spacing between studs will not be accidentally thrown off by a user mistakenly aligning a stud against the wrong side of the chalk mark.

FIG. 2 shows a tape 114 according to an alternate embodiment of the present invention. The tape 114 includes a backing 116 having smooth upper and lower surfaces 120, 121. The backing can be of plastic, metal, or any other material having a smooth surface generally non-receptive to chalk. Markers 124 of a porous material generally receptive to chalk, such as cloth, are affixed at regularly spaced intervals 128, 130 to the upper and lower surfaces 120, 121 of the backing 116. The spaced interval 128 between markers 124 along the upper surface 120 of the tape 114 is sixteen inches, and the spaced interval 130 between markers 124 along the lower surface 121 of the tape is twenty-four inches. The tape 114 is normally stored within a housing (not shown) and cooperates with bodies of marking chalk as the tape is extended and retracted with respect to the housing in the manner hereinabove described for the chalk marking device 10.

To use the tape 114 of the alternative embodiment, the tape is withdrawn from its housing, the upper and lower surfaces 120, 121 of the backing 116 being contacted by the bodies of marking chalk as the tape is extended. Since the smooth upper and lower surfaces 120, 121 are generally non-receptive to chalk, only the cloth markers 124 retain the chalk particles. When the tape 114 is stretched taut along the desired line and snapped in the manner hereinabove described, chalk is transferred from the cloth markers 124 spaced along the backing 116 onto the workpiece. As hereinabove described for the improved chalk marking device 10, a user may place marks at either sixteen or twenty-four inch intervals, depending upon whether the upper or lower surface 120, 121, of the tape 114 is snapped against the workpiece surface.

The features and advantages of the tape 114 according to the alternate embodiment of the present invention are similar to the features and advantages enumerated above for the chalk line marking device 10 of the preferred embodiment. The cloth markers 124 are disposed along the upper surface 120 of the backing 116 at sixteen inch intervals, and the markers are disposed along the lower surface 121 of the backing at twenty-four inch intervals. Accordingly, the same tape can be used to provide chalk marks on the workpiece surface at either sixteen inch or twenty-four inch intervals, depending upon which side of the tape is imposed against the workpiece.

Similarly, by employing two-dimensional markers of intersecting strips, the chalk marks placed on the workpiece surface will consist of intersecting chalk lines, the intersection between the chalk lines marking the desired locations. By providing an intersection between two lines to mark the desired intervals, rather than relying upon the transition between chalked and unchalked portions along a single line to mark the desired intervals, unintended interruptions resulting from inconsistent chalking of the marker or from improper snapping of the marker against the workpiece surface will not be mistaken as indicating the desired interval.

While the foregoing embodiments employ a cloth layer and cloth markers as their chalk-receptive elements, other porous materials generally receptive to chalk may be employed without departing from the scope and spirit of the appended claims. Similarly, it will be understood that metal and plastic have been disclosed for the non-chalk-receptive components of the present invention only by way of example, and that other materials having a smooth surface generally non-receptive to chalk may be employed.

Finally, it will be understood that the preferred embodiment of the present invention has been disclosed by way of example, and that other modifications may occur to those skilled in the art without departing from the scope and spirit of the appended claims.

I claim:

1. An extensible tape for placing chalk marks on a workpiece at regularly spaced intervals, comprising:
   a first layer of porous material receptive to chalk; and
   a second layer having a smooth surface substantially non-receptive to chalk, said second layer overlying one face of said first layer, said second layer having holes therein at regularly spaced intervals through which the underlying portions of said first layer are exposed;
   whereby when said tape is brought into contact with a body of chalk, said portions of said first layer exposed through said holes receive particles of said chalk, and said smooth second layer is non-receptive to said chalk, such that when said chalked tape is extended across a surface of said workpiece with said second layer imposed against said workpiece surface, chalk is transferred from said portions of said chalk-receptive first layer exposed through said holes in said second layer onto said workpiece to provide chalk marks at said regularly spaced intervals.

2. The tape of claim 1, further comprising a third layer having a smooth surface substantially non-receptive to chalk, said third layer overlying the opposing face of said first layer.

3. The tape of claim 2, wherein said third layer has holes therein at regularly spaced intervals through which the underlying portions of said first layer are exposed.

4. The tape of claim 3, wherein said regularly spaced intervals of said holes in said third layer are different from said regularly spaced intervals of said holes in said second layer.

5. The tape of claim 1, wherein said holes defined by said second layer comprise pairs of intersecting slots, said slots providing intersecting chalk lines on said workpiece at said regularly spaced intervals.

6. The tape of claim 5, wherein said pairs of intersecting slots comprise T-shaped apertures.

7. An apparatus for placing chalk marks at regularly spaced intervals along a straight line on a workpiece, comprising:

a tape having a first layer of porous material receptive to chalk and a second layer overlying said first layer and having a smooth surface substantially nonreceptive to chalk, said second layer having holes therein at regularly spaced intervals through which the underlying portions of said first layer are exposed, whereby chalk applied to said tape is received by said portions of said porous first layer exposed through said holes in said second layer and not received by said smooth second layer;

a housing within which said tape is normally stored; and an aperture in said housing through which said tape is extensible whereby when chalk is applied to said tape and said tape is extended and laid on said workpiece with said second layer imposed against said workpiece surface, chalk is transferred from the portions of said first layer exposed through said holes in said second layer onto said workpiece to provide chalk marks on said workpiece at said regularly spaced intervals.

8. The apparatus of claim 7, wherein said tape further comprises a third layer having a smooth surface substantially non-receptive to chalk, said third layer overlying said first layer opposite said second layer.

9. The apparatus of claim 8, wherein said third layer has holes therein at regularly spaced intervals through which the underlying portion of said first layer are exposed.

10. The apparatus of claim 9, wherein said regularly spaced intervals of said holes in said third layer are different from said regularly spaced intervals of said holes in said second layer.

11. The apparatus of claim 7, wherein said holes defined by said second layer comprise intersecting slots, said slots providing intersecting chalk lines at said regularly spaced intervals.

12. The apparatus of claim 11, wherein said intersecting slots comprise T-shaped apertures.

* * * * *